United States Patent [19]

Appelbaum et al.

[11] 4,047,179
[45] Sept. 6, 1977

[54] IFF ANTENNA ARRANGEMENT

[75] Inventors: Alfred J. Appelbaum, Newton Center, Mass.; Michael J. Collins, Merrimack, N.H.; Jerome D. Hanfling, Framingham, Mass.

[73] Assignee: Raytheon Company, Lexington, Mass.

[21] Appl. No.: 682,428

[22] Filed: May 3, 1976

[51] Int. Cl.² ............................................. H01Q 3/26
[52] U.S. Cl. .................................. 343/768; 343/771; 333/33; 333/84 M
[58] Field of Search ....................... 343/768, 771, 854

[56] References Cited
U.S. PATENT DOCUMENTS 3,665,480  5/1972  Fussett .................. 343/768

Primary Examiner—Archie R. Borchelt
Assistant Examiner—David K. Moore
Attorney, Agent, or Firm—Philip J. McFarland; Joseph D. Pannone; Richard M. Sharkansky

[57] ABSTRACT

An improved IFF antenna arrangement is shown to comprise two linear arrays, each one of the arrays being made up of a plurality of similar cavity-backed radiating slots fed by a stripline feed. The impedance of each radiating slot is matched, at two different operating frequencies, to the impedance of a combination of the impedances of the corresponding cavity and stripline feed.

7 Claims, 4 Drawing Figures

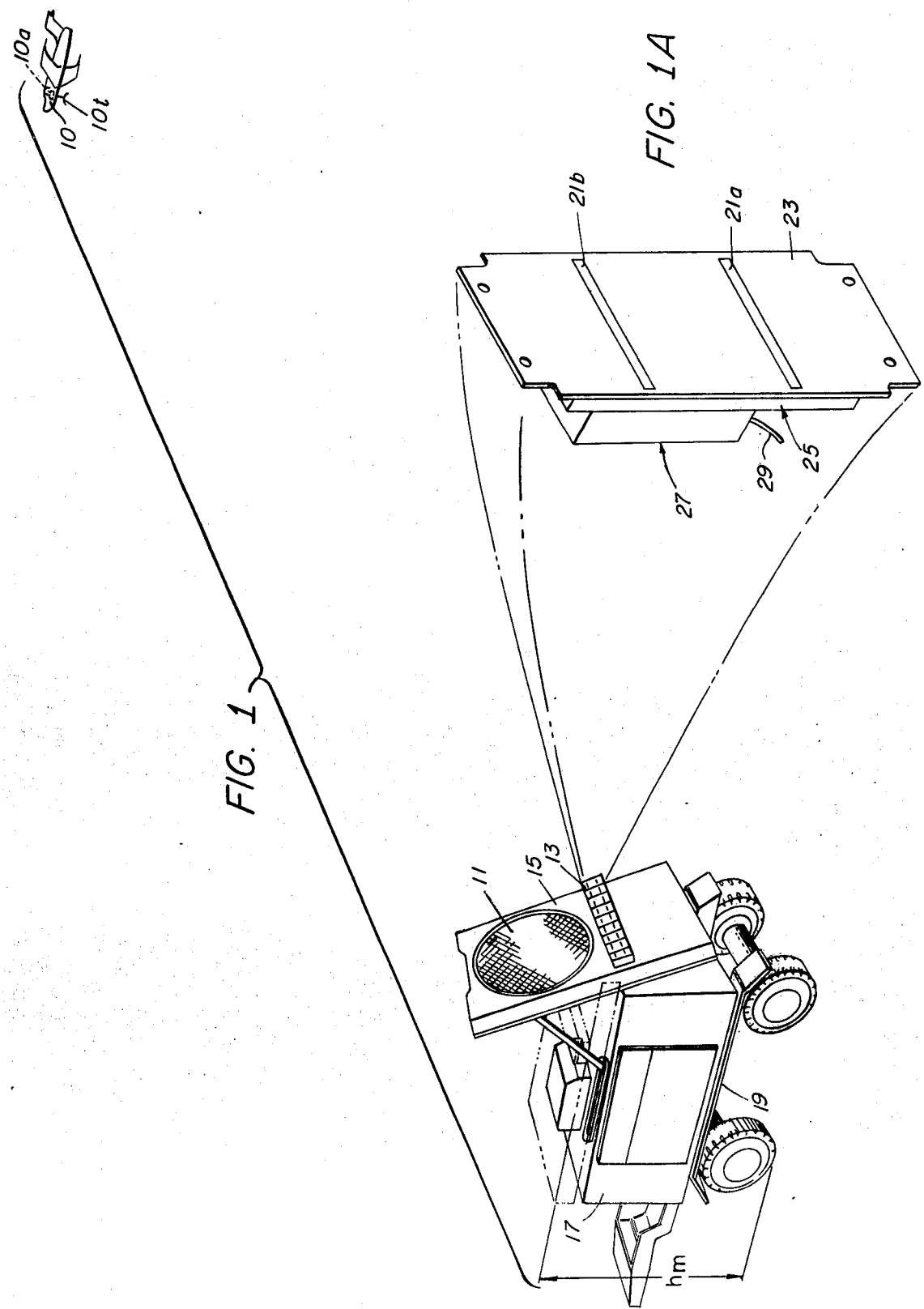

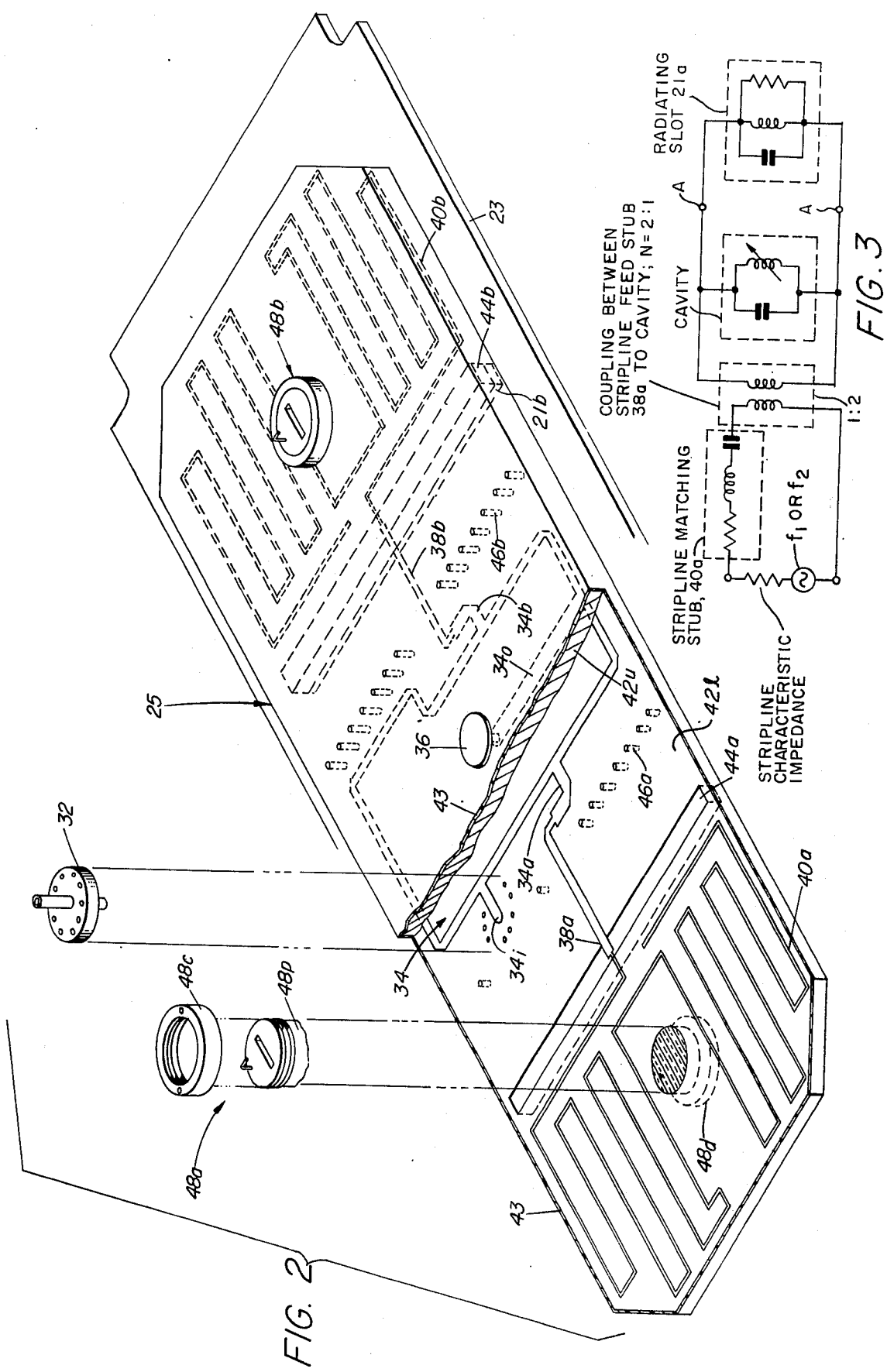

IFF ANTENNA ARRANGEMENT

The invention herein described was made in the course of, or under a contract or subcontract thereunder, with the Department of Defense.

BACKGROUND OF THE INVENTION

It has been accepted practice in the art to provide equipment (commonly referred to as IFF) to distinguish between radar echo signals from friendly aircraft and unidentified, or hostile, aircraft. Thus, various types of equipment have been used to allow an interrogating signal to be transmitted from ancillary equipment at a radar toward a target aircraft and to receive, if such aircraft is friendly, a properly coded reply from a transponder in such aircraft. In order to reduce the IFF equipment which must be carried by friendly aircraft to a minimum and to simplify the necessary ancillary equipment at the radar, a single frequency band has been reserved for IFF systems. While such standardization has allowed satisfactory IFF systems to be designed to operate with radars of any frequency, there are instances in which technical problems cannot be solved with conventional IFF equipment.

One particular problem which is often encountered is that a response from friendly aircraft not meant to have been interrogated may be received. Such a response may occur, if proper measures are not taken, when a friendly aircraft is located in a sidelobe of the IFF interrogator at the radar. One way to suppress a response from a friendly aircraft located in a sidelobe of an IFF interrogator is to transmit an interrogating code which will not cause a response to be generated. For example, if there is a particular difference in power level between portions of the interrogating code as received by a transponder in a friendly aircraft, such transponder may be inhibited from generating a reply. Thus, if a first portion of an interrogating code is transmitted through an omnidirectional antenna with a power level equal to the power level of a corresponding first portion in the first sidelobe of the directional antenna and the remainder of the interrogating signal is transmitted through the directional antenna, simple signal processing circuitry may be incorporated in the transponder in an aircraft to determine whether the aircraft is located in the main lobe or the first sidelobe of the directional antenna. The operation of the transponder will be enabled if the aircraft is in the main lobe or inhibited if in the sidelobe. Another measure which may be taken is to transmit through a directional antenna a first portion of an interrogating code in a sum channel and the second portion of such signal through a difference channel. Again, simple signal processing circuitry in the transponder in an aircraft could be used to determine whether such aircraft is in the main lobe or a sidelobe of the directional antenna. Unfortunately, however, there may be no space available for an omnidirectional antenna or the performance characteristics of a directional antenna transmitting a difference pattern may not be good enough for the particular application.

SUMMARY OF THE INVENTION

Therefore, it is a primary object of this invention to provide an improved antenna for use in an IFF system.

The foregoing object and others to become clear are here accomplished by providing an array of antenna assemblies, each one thereof comprising a pair of dielectrically loaded slots in combination with a cavity fed by a stripline feed. The elements of each antenna assembly are arranged so that an impedance match is effected at both the frequency of the coded interrogating signal and the frequency of the transponder in an aircraft. The feed to the linear array of antenna elements is controlled during operation so that a first portion of an interrogating code is transmitted in a sum channel and a second portion of such code is transmitted in a difference channel. Signal processing circuitry in the transponder in an aircraft then determines whether or not a coded reply is to be made to the interrogating signal.

BRIEF DESCRIPTION OF THE DRAWINGS

For a more complete understanding of this invention reference is now made to the following description of a preferred embodiment of this invention as illustrated in the accompanying drawings wherein:

FIG. 1 is a sketch showing the general relationship of an array of antenna assemblies according to this system in an IFF system;

FIG. 1A is an isometric view of an antenna assembly shown in FIG. 1;

FIG. 2 is an isometric view, partially broken away, of a portion of the assembly shown in FIG. 1A showing how the radiating slots, the cavities and the stripline feed are related; and FIG. 3 is an equivalent circuit of the assembly shown in FIG. 2.

DESCRIPTION OF THE PREFERRED EMBODIMENTS

Referring now to FIG. 1 it may be seen that a preferred embodiment of an IFF system according to this invention is used in conjunction with a portable radar (not numbered) to identify an aircraft 10 as a friendly aircraft. Thus, a phased array 11 for the radar and a linear array of IFF antenna assemblies (such as those marked by the numeral 13 and described hereinafter) are affixed in any convenient manner to a common mount 15. The latter (here shown in full lines in its operating position) in turn is mounted on carrier 17 supported on a wheeled vehicle 19. The transmitter and receiver (neither or which is shown) for the radar are mounted within the carrier 17 in a conventional manner. Appropriate connections (not shown) are provided to allow transmission, reception and processing of radar signals through the phased array 11. An exemplary one of the IFF antenna assemblies 13 is described in detail hereinafter. Suffice it to say here that the linear array of such assemblies is connected, through a conventional corporate feed (not shown) to collimate and steer the beam from the linear array of antenna assemblies 13) to an IFF transmitter and an IFF receiver (neither of which is shown) in the carrier 17. The IFF transmitter is controlled, again in any conventional manner, to transmit (when required) a coded interrogating signal, one portion of such signal being directed through the sum channel of the monopulse corporate feed and a second portion of such signal being passed through the difference channel of the monopulse corporate feed. It will be apparent, therefore, that the ratio between the amplitudes of the two portions of the coded interrogating signal, as observed from any illuminated point in space, may be considered to be dependent upon the position of such point relative to the centerline of the beam propagated when the sum channel of the monopulse corporate feed is actuated. To put is another way, whenever the amplitude of the first portion of the coded interrogating signal at a given point in space is higher than the amplitude of the second portion of that signal, the given point lies within the main lobe of the beam resulting from actuation of the sum channel of the monopulse corporate feed; conversely, when the amplitude of such first portion is less than the amplitude of the second portion, the given point is outside such main lobe.

The IFF equipment in the aircraft 10 is conventional, consisting here of an antenna 10a and a transponder 10t. The latter, in addition to a receiver and a transmitter, includes logic circuitry to sense the amplitudes of the first and second portions of the coded interrogating signal and, in accordance with the ratio between such amplitudes, to enable or inhibit the transmitter in the transponder 10t.

It will now be observed that, when the carrier 17 is positioned for transportation (as indicated by broken lines in FIG. 1), the clearance (here designated "$h_m$") of phased array 11 and the IFF antenna assemblies 13 must be as low as possible. To accomplish such end, the thickness of the IFF antenna assemblies 13 (measured orthogonally to the amount 15) must be a minimum. Because the IFF antenna assemblies 13 are operated at L-band, a conventional approach to the design of such assemblies would result in an excessive clearance. Therefore, the design of the IFF antenna assemblies 13 must differ from a conventional design as here contemplated and now to be described.

Referring now to FIG. 1A it may be seen that each IFF antenna assembly 13 here comprises a pair of radiating slots 21a, 21b formed in a metallic cover plate 23, each one of such slots being in operative relationship to a cavity 25 coupling each one of the radiating slots 21a, 21b to a feed stub (feed stubs 38a, 38b in FIG. 2). Each one of such stubs is connected through stripline to a conventional phase shifter assembly. Control signals for the individual phase shifters are carried over a cable 29 and radio frequency signals to the sum and difference ports of the monopulse corporate feed are carried over coaxial cables (not shown). It will now be apparent that, when the IFF antenna assemblies are disposed as shown in FIG. 1 and the sum port of the monopulse corporate feed is energized, a single symmetric steerable beam is produced. Such central null coincides with the centerline of the single beam produced by energizing the sum port. Further, each of the beams produced is wide in elevation.

Referring now to FIG. 2, it may be see that radio frequency energy is passed through a conventional coaxial cable-to-stripline connector 32, to an input port 34i of a stripline hybrid coupler 34. The output port 34o of the stripline hybrid coupler 34 is connected to a matched load 36. The arms 34a, 34b of the stripline hybrid coupler 34 are connected, as shown, through conventional stripline-to-stripline quarter-wave impedance transformers (stripline feed stubs 38a, 38b) which also serve as feed lines for the slots. The stripline feed stubs 38a, 38b in turn are terminated in stripline matching stubs 40a, 40b. It will be apparent to one of skill in the art that the just-mentioned stripline elements are formed as a printed circuit on a dielectric sheet 42l and that the stripline section is completed by placing a second dielectric sheet 42u thereover. An electrically conductive covering 43, as a thin layer of copper, is deposited over the exposed surfaces of the dielectric sheets 42l, 42u to form the stripline section. Rectangular openings 44a, 44b corresponding to the radiating slots 21a, 21b are formed in the electrically conductive covering. A plurality of holes, as those numbered 46a, 46b, are formed through the stripline section as shown. Each one of such holes is plated through with an electrically conductive material to connect the electrically conductive covering 43 on the top and the bottom of the stripline section. The holes so plated act as shorting posts. When relatively small (in terms of wavelengths of the radio frequency energy to be transmitted and received), the plated holes 46a, 46b appear to be a solid electrically conductive wall. As a result, then, the stripline feed stubs 38a, 38b and the stripline matching stubs 40a, 40b appear to be in cavities having rectangular openings 44a, 44b formed therein. To complete the arrangement being described, trimmers 48a, 48b are disposed in the cavities between portions of the stripline matching stubs 40a, 40b. Each one of the trimmers 48a, 48b is made up of a plug 48p of a dielectric material in which an electrically conductive wire is eccentrically embedded. The plug 48p is threaded to mate with a threaded cap 48c which, in turn, is attached to the electrically conductive covering 43.

It will be appreciated that, absent the matching stubs 40a, 40b and the trimmers 48a, 48b, the stripline circuitry and radiating slots just described may be designed and fabricated to perform adequately well at a single given frequency in the L-band. If, however, it is required, as it is here, that the combination operate at two different frequencies, $f_1$, $f_2$, there will be an impedance mismatch at either, or both, such frequencies. Any mismatch, of course, reduces the efficiency of the IFF antenna assembly 13 and should be reduced to a minimum.

The manner in which the impedance of the arrangement is here contemplated to be adjusted to accomplish a match may best be explained by referring to the equivalent circuit shown in FIG. 3. It will be recognized that an ideal impedance match (at any operating frequency) between the radiating slot 21a and the combination of the remaining elements shown in FIG. 3 requires that the impedance of the radiating slot be the complex conjugate of the effective impedance of the combination of the remaining elements. That is to say, looking in both directions from the points marked A—A, the impedance must be in accordance with the following:

$$R_s \pm jX_s = R_c \pm jX_c \qquad \text{Eq. (1)}$$

where $R_s$ is the resistance of the radiating slot 21a;
$X_s$ is the reactance of the radiating slot 21a;
$R_c$ is the effective resistance of the combination of the remaining elements in FIG. 3; and
$X_c$ is the effective reactance of the combination of the remaining elements in FIG. 3.

It will be recognized that, for convenience in calculating any of the various parameters in Eq. (1), it may be desirable to use conductances instead of resistances and susceptances instead of reactances so that an admittance match rather than an impedance match may be determined. It will also be observed that if the resonant frequency (sometimes referred to hereinafter as frequency $f_o$) of the radiating slot 21a, the cavity (unnumbered) and the stripline matching stub 40a is the same and the operating frequency, say $f_e$, is lower than frequency $f_o$, then:

a. the reactance of the radiating slot 21a will be inductive; and b. the effective reactance of the combination of the remaining elements shown in FIG. 3 may be either inductive or capacitive. On the other hand, if the operating frequency, say $f_h$, is higher than the frequency $f_o$, then:

a. the reactance of the radiating slot 21a will be capacitive; and b. the effective reactance of the combination of the remaining elements may be either inductive or capacitive.

Whether the effective reactance of the combination of the remaining elements in FIG. 3 at either operating frequency, $f_e$ or $f_h$, is inductive or capacitive, depends upon the relative magnitude and the particular sense (whether inductive or capacitive) of the stripline matching stub 40a and cavity, as modified by the coupling between the stripline feed stub 38a and the cavity. It may be seen, therefore, that the solution to the matching problem at the two operating frequencies, $f_e$ and $f_h$, involves the proportioning of the inductive and capacitive components in the stripline matching stub 40a and the cavity so that, with an operating frequency $f_e$, the effective reactance of the two is capacitive and equal in magnitude to the reactance of the radiating slot 21a and, with an operating frequency $f_h$, the effective reactance of the two is inductive and equal in magnitude to the reactance of the radiating slot 21a. To accomplish the foregoing, it will be observed that the coupling between the stripline feed stub 38a and the cavity is here represented as an impedance transformer (not numbered). The turns ratio of such transformer is 2:1 by reason of the fact that the cavity is proportioned to support only the $TE_{1,0}$ mode and the stripline supports only the TEM mode. The impedance ratio of the impedance transformer is, therefore, 4:1. That is to say, the effective reactance of the stripline matching stub 40a appears to be four times its actual reactance (looking from the cavity toward such stub).

With the reactive portions of the impedance balanced, it then remains (to have a maximum power transfer) to equalize the radiation resistance of the radiating slot 21a and the resistance of the remaining elements looking back toward the generator from A—A. The resistance of the latter is, as shown, the characteristic impedance of the stripline plus the resistance of the stripline matching stub 40a. The resistance of the latter is dependent upon its length. As shown in FIG. 2, the length of such stub (always remembering that such length must be an odd integral multiple (here 19) of one-quarter wavelength at frequency $f_0$) is nineteen quarter-wavelengths long as is required for providing the reactances at $f_e$ and $f_h$. This is obtained by folding within the cavity.

The conductance and susceptance of the radiating slot 21a are dependent upon the dielectric constant of the material filling and the length of the metallic cover plate 23. It has been found that a dielectric constant of such material filling (here alumina having a dielectric constant of approximately 9.3) will increase the slot conductance so that impedance matching at $f_e$ and $f_h$ can be achieved with less reactance, thereby providing a broader band design. The susceptance introduced by the slot cover can be compensated for by adjusting the cavity reactance.

It will be recognized that an ideal impedance match (at any operating frequency) between the radiating slot 21a and the combination of the remaining elements shown in FIG. 3 requires that the impedance as seen by generator (not numbered) at both operating frequencies $f_1$, $f_2$ be real, i.e. have little or no reactive component. The impedance seen by the generator of FIG. 3 is that that would be seen at the end of the stripline feed stub 38a (here acting as a transformer) looking into the combination of elements shown in FIG. 3. Neglecting, for the moment, the contribution of the stripline matching stub 40a at frequency $f_o$ (not shown on the drawings) centered between $f_1$ and $f_2$, the impedance of the combination being discussed has a large reactive component. The first step in the matching process is to make the combination being discussed resonant at the mid-band frequency, $f_o$. Such end may be accomplished by adjusting the length of the cavity (by changing the position of the cavity walls with respect to the radiating slot) or by dielectrically loading such slot. The stripline matching stub 40a is then used to tune out the reactive components at frequencies $f_1$ and $f_2$. The optimum length of the stub was determined to be nineteen quarter-wavelengths at the midband frequency, $f_o$, with a characteristic impedance of approximately 94 ohms. The consideration involved in determining the optimum design for the stripline matching stub 40a is that the reactance of such stub must be sufficient to tune out the reactance provided by the combined slot and cavity impedances at both $f_1$ and $f_2$. In general, the reactance of the stripline matching stub 40a is given by:

$$X_s = -Z_0 \cot \beta l$$

where $Z_0$ is the characteristic impedance of such stub, $\beta = 2\pi/\lambda$ (where $\lambda$ is the wavelength in the stripline and $l$ is the length of such stub. The stripline construction and the given ground plane spacing puts an upper limit on the characteristic impedance of the stripline matching stub 40a. If the impedance of such stub is too high, the width will be too narrow to be practicable in stripline and loss would be excessive. Having chosen the characteristic impedance of the stripline matching stub 40a, the length which will then produce the required reactance slope is determined so that a capacitive reactance of approximately 100 ohms at frequency $f_1$ and an inductive reactance of approximately 100 ohms at frequency $f_2$ are provided.

Having described a preferred embodiment of this invention, it will now be apparent to one of skill in the art that changes may be made without departing from our inventive concepts. For example, the physical dimensions and electrical characteristics of the various elements may be changed if the operating frequencies $f_1$, $f_2$ are to be changed without requiring that the thickness of the contemplated assembly be increased to any substantial degree. It is felt, therefore, that this invention should not be restricted to its disclosed embodiment, but rather should be limited only by the spirit and scope of the appended claims.

What is claimed is:

1. An antenna arrangement adapted to transmit radio frequency energy at a first frequency, $f_1$, and to receive radio frequency at a second frequency, $f_2$, such arrangement comprising:

a. a stripline having a center conductor disposed between opposing ground planes and a radiating slot formed in one of such ground planes, the resonant frequency of such slot being equal to the average of the frequencies $f_1$ and $f_2$; and b. electrically conductive means connecting the opposing ground planes to form a generally rectangular cavity into which the center conductor projects and the radiating slot opens, said slot being coupled to said cavity at an end opposite the electrically conductive the resonant frequency of such cavity being equal to the average of the frequencies $f_1$ and $f_2$.

2. An antenna arrangement as in claim 1 wherein a dielectric material having a dielectric constant exceeding 1.0 is deposited in the radiating slot to fill and to load such slot.

3. An antenna arrangement as in claim 2 wherein the coupling means comprises:
   a. a feed stub formed as an extension of the center conductor of the stripline, such stub being disposed, within the cavity, in an orthogonal relationship with the radiating slot; and
   b. a matching section, formed as an extension of the feed stub, such matching section being disposed within the cavity.

4. An antenna arrangement as in claim 3 wherein the length of the matching section is equal to N quarter-wavelengths, at the average of the frequencies $f_1$, $f_2$, where N is an odd integer greater than one.

5. An antenna arrangement as in claim 4 wherein:
   a. the wall of the cavity in which the radiating slot is formed is an extension of one of the ground planes of the stripline; and
   b. an opposing wall of the cavity is an extension of the other one of the ground planes of the stripline.

6. An antenna arrangement as in claim 5 having, additionally, means for tuning the cavity to resonance at the average of the frequencies $f_1$, $f_2$.

7. An antenna arrangement as in claim 6 wherein the tuning means comprises:
   a. a dielectric plug rotatably mounted within the cavity between the extensions of the stripline; and
   b. an electrically conductive wire supported by the dielectric plug within the cavity between the extension of the stripline, such wire being spaced from the center of such plug.

* * * * *